Patented Dec. 19, 1933

1,940,392

UNITED STATES PATENT OFFICE 1,940,392

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application January 21, 1933
Serial No. 652,942

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil", and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results and sometimes with inferior results. Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class, with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by our process is of the kind that is composed of a mixture of materials, but it is also that particular type of mixture which is characterized by great specifity both in the substances of which it is composed, and in the quantities or proportions of said substances. It consists of or comprises a naphthenic acid or salt of the kind hereinafter defined, mixed with a certain specific substituted aromatic sulfonic acid or salt of the kind hereinafter defined. Any or all naphthenic acids or salts are not suitable, and any or all substituted aromatic sulfonic acids or salts thereof are not suitable. On the contrary, only naphthenic acids and substituted aromatic sulfonic acids of the particular kind herein defined and described are contemplated by our invention. We have not found high molecular weight to be suitable in replacing the naphthenic acids used to produce our improved demulsifying agent, even though they are the equivalents of such naphthenic acids for many ordinary purposes.

The naphthenic acid or salt intended to be used as one ingredient or substance of the demulsifying agent contemplated by our present process, are the particular naphthenic acids described in our pending application for patent, Serial No. 652,941, filed January 21, 1933. Accordingly, we have herein used the term "a naphthenic acid of the kind herein defined" to mean a naphthenic acid or a mixture of naphthenic acids, having a molecular weight not less than 200 and not over 575, having a mean molecular weight of approximately 225, and having a distillation range varying from approximately 230° C. to 310° C. A typical distillation range is shown in the following table:

| | |
|---|---|
| 10% | 230° C. |
| 20% | 255° C. |
| 30% | 268° C. |
| 40% | 273° C. |
| 50% | 278° C. |
| 60% | 279° C. |
| 70% | 287° C. |
| 80% | 292° C. |
| 85% | 292° C. |
| 100% | 310° C. |

These naphthenic acids should be soluble in 65% ethyl alcohol when 10% naphthenic acid is added, but they should be insoluble when only 5% is added. The selected naphthenic acids should show no substantial iodine number. When the iodine number determination is made by the Hübl-Waller method, they should not show an iodine number greater than 2 or 3. The saponification number should be in the neighborhood of 250. The specific gravity at 77° F. should be about .9635. Naphthenic acids of the kind above described are commercially available, and in selecting the particular naphthenic acid that is to be used as one ingredient of the demulsifying agent, reasonable variation from the above described specification is permissible, but it should only be variation of the kind that one would expect in ordinary commercial products. If any marked deviation is made from the above described specification of the naphthenic acids employed, it will be found that the selected naphthenic acid is substantially worthless.

The substituted aromatic sulfonic acid or salts intended to be used as the other ingredient or substance of the mixture constituting the demulsifying agent contemplated by our process, are limited to those derived from alcohols having at least three carbon atoms and not more than five carbon atoms, i. e., propyl alcohol, butyl alcohol, and amyl alcohol. It is to be understood that the isomeric alcohols, such as normal butyl, isobutyl, secondary butyl, etc. are considered equally satisfactory, and that the isomeric sulfonic acids, such as the alpha and beta, are also considered equally suitable for our specific reagent. The mixture is limited to the alkylated naphthalene sulfonic acids in the form of a water-soluble alkali salt. The ammonium radical is considered as an alkali along with the metals, sodium and potassium. Ammonium hydroxide is just as satisfactory for neutralizing the sulfonic acids as is sodium or potassium hydroxide. In the manufacture of ammonium soaps, for certain purposes, it has been found that improved products can sometimes be obtained by replacing the ammonia with certain hydroxy amines, such as triethanolamine, which act just the same as ammonia. It is also understood that these hydroxy amines which act like ammonia are considered the equivalent of the ammonium radical or the equivalent of an alkali metal in the present invention. These substituted naphthalene sulfonic acids of the type described represent only a small percentage of the large number of substituted polynuclear sulfonic acids. For instance, substituted aromatic sulfonic acids previously disclosed for demulsification, include those derived from the higher alkyl alcohols, as well as from aryl alcohols and aralkyl alcohols, and even cyclo alcohols. Furthermore, previously known demulsifiers include not only the substitution of alcohol radicals in the aromatic nucleus, but also sulfonic acids in which aldehyde residues, ketone residues, or even fatty residues are substituted in the aromatic nucleus. Then too, instead of introducing such residues into an aromatic nucleus, it has been suggested to introduce them into aromatic derivatives, such as hydroxy, chloro, nitro, or carboxyl derivatives. It has been suggested to use this multitude of sulfonic acids in the form of calcium or magnesium salts, or in the form of various esters, or even after acylation with an amine in the manner that the sulfonyl radical substitutes or replaces one of the hydrogens of the selected amine.

As previously stated, we contemplate using only a few members of the above mentioned large class of aromatic substituted sulfonic acids or salts, namely, propylated or butylated or amylated naphthalene sulfonic acid in the form of a sodium, potassium, ammonium or amine salt. We do not contemplate a reagent in which some other substituted group, such as a hydroxyl group, is present in the nucleus. Moreover, we make no broad claim to mixtures composed of naphthenic acids of the kind defined, and aromatic sulfonic acid salts of the kind herein described, but, on the contrary, we limit our invention to a demulsifying agent containing not over 40% of water, that will show oil solubility, as well as water solubility. Mixtures of the kind contemplated by our process must dissolve in kerosene and produce a 20% solution, that is, when 20 parts of the mixture is mixed with 80 parts of ordinary kerosene. Unless the mixture shows this oil solubility, it does not appear to have any unusual effectiveness in treating petroleum emulsions. Naphthenic aicds of the kind herein defined may be replaced in part by the sodium, potassium or ammonium salt, that is, the sodium, potassium, or ammonium naphthenate, derived from a naphthenic acid coming within the specification previously set forth. In addition to having the limiting characteristics previously set forth, the mixture contemplated by our process must also show water miscibility. In other words, the mixture, in addition to showing 20% oil solubility, above described, must be capable of mixing with water to form a 5% solution or suspension of a relatively stable type.

The most feasible way of preparing a mixture of the kind previously described is to make a combination in which there is no more than three times as much of one type of material or reagent as the other. In other words, if three parts of the substituted naphthalene sulfonic acid is used, one must mix therewith not less than one part of naphthenic acids of the kind herein defined, and not more than nine parts of such naphthenic acids. The actual amount of the naphthenic acid required depends on various factors, namely, whether the product is a monoalkylated aromatic salt, or contains more than one substituting alkyl radical. It also depends on whether or not there is only one sulfonic acid radical present, or if there is more than one. It also depends on the amount of water present, and to some degree, on whether or not the water present contains a considerable amount of dissolved inorganic salts, such as sodium sulfate, as an inherent impurity. Sometimes small amounts of naphthalene sulfonic acid or salts thereof are present, which also effect solubility. Solubility is also effected dependent on the base used for neutralization. Generally speaking, potassium salts or ammonium salts show greater oil solubility than sodium salts. In any event, when the mixture of the substituted aromatic sulfonic acid salt and naphthenic acids of the kind described is prepared, if oil solubility is not sufficient, a small amount of a base, such as ammonia, should then be added, so as to partially neutralize the naphthenic acids, and thus increase oil solubility. In the majority of cases, it is best that the mixture be made in the proportion of approximately one part of the substituted aromatic sulfonic acid salt and one part of naphthenic acids of the kind described with subsequent neutralization.

Our preferred demulsifying agent is prepared in the following manner: A mixture of monobutylated and dibutylated naphthalene sulfonic acid salt is prepared in the customary manner and is neutralized with ammonia. If need be, it is concentrated so as to contain not over 50% of water, and preferably as little as 35% of water. It is mixed with an equal part of naphthenic acids of the kind herein defined, and should show oil solubility when 20 parts of the mixture is shaken with 80 parts of kerosene. If said mixture does not possess such oil solubility, strong ammonium hydroxide is cautiously added with constant stirring and frequent tests are made to determine the appearance of such desired oil solubility. Sometimes when such desired oil solubility is obtained, it may be desirable to continue to add some more of the neutralizing agent, such as ammonia, or caustic soda, or caustic potash, or triethanolamine, as the case may be, but in no event should the addition of the neutralizing agent be enough to eliminate the oil solubility. After the reagent has shown oil solubility of the kind described, it should be tested in water by preparing a 5% mixture. Such mixture should result in a strong milky suspension, or even a clear solution. In other words, the mixture must show ready miscibility with water, as well as with oil. The final reagent may be used after dilution with kerosene, or carbon tetrachloride, or a water insoluble alcohol, such as amyl alcohol, or any other desired vehicle, which does not destroy the oil and water solubility of the kind previously noted. We prefer to use the reagent diluted with 25% of kerosene.

We believe that from the foregoing it will be apparent that our invention is not concerned with all mixtures of two classes of materials previously used for demulsification, but, on the contrary, is concerned with only a very limited class or type of mixtures that must have the characteristic or quality of both oil and water miscibility. The superiority of the reagent or demulsifying agent contemplated by our process is based upon its ability to treat certain emulsions more advantageously and at a somewhat lower cost than is possible with other known demulsifiers. We have not found that our improved demulsifying agent is of universal effectiveness, and we do not believe that it will supersede the majority of the modified fatty acids, sulfated fatty acids, etc., heretofore used extensively as treating agents in the resolution of petroleum emulsions. It is believed that the particular demulsifying agent or treating agent herein described will find comparatively limited application, so far as the majority of oil field emulsions are concerned, but we have found that such a demulsifying agent has commercial value, as it will economically break or resolve certain oil field emulsions in a small number of cases which cannot be treated as easily and at so low a cost, with the demulsifying agents heretofore available.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a water and oil-soluble demulsifying agent containing
   (A) not over 40% of water;
   (B) a water-soluble alkali salt of an alkylated naphthalene sulfonic alkali acid derived from an alcohol having at least three carbon atoms and not more than five carbon atoms; and
   (C) a naphthenic acid body produced from naphthenic acid having a molecular weight range of from 200 to 575, a mean molecular weight of approximately 225, and a distillation range of from 230° C. to 310° C. and selected from the class comprising acids and salts, the said mixture also being characterized by the fact that the ratio of B and C is within the limits of 1 to 3 and 3 to 1 and that the demulsifying agent will produce a 20% solution in kerosene and a 5% solution or suspension in water.

2. A process for breaking petroleum emulsions of the water-in-oil type, which consists in subjecting the emulsion to the action of a water and oil-soluble demulsifying agent containing
   (A) not over 40% of water;
   (B) a water-soluble alkali salt of a butylated naphthalene sulfonic acid; and
   (C) a naphthenic acid body produced from naphthenic acid having a molecular weight range of from 200 to 575, a mean molecular weight of approximately 225, and a distillation range of from 230° C. to 310° C. and selected from the class comprising acids and salts, the said mixture also being characterized by the fact that the ratio of B and C is within the limits of 1 to 3 and 3 to 1 and that the demulsifying agent will produce a 20% solution in kerosene and a 5% solution or suspension in water.

3. A process for breaking petroleum emulsions of the water-in-oil type, which consists in subjecting the emulsion to the action of a water and oil-soluble demulsifying agent containing (A) not over 40% of water;

(B) a water-soluble ammonium salt of a butylated naphthalene sulfonic acid; and (C) a naphthenic acid; body produced from naphthenic acid having a molecular weight range of from 200 to 575, a mean molecular weight of approximately 225, and a distillation range of from 230° C. to 310° C. and selected from the class comprising acids and salts, the said mixture also being characterized by the fact that the ratio of B and C is within the limits of 1 to 3 and 3 to 1 and that the demulsifying agent will produce a 20% solution in kerosene and a 5% solution or suspension in water.

4. A process for breaking petroleum emulsions of the water-in-oil type, which consists in subjecting the emulsion to the action of an oil and water-soluble demulsifying agent containing (A) not over 40% of water;

(B) a water-soluble ammonium salt of a butylated naphthalene sulfonic acid; and (C) a naphthenic acid body derived from naphthenic acid having a molecular weight range of from 200 to 575, a mean molecular weight of approximately 225, and a distillation range of from 230° C. to 310° C. and selected from the class comprising acids and salts, in an amount approximately equal to the amount of B, the said mixture also being characterized by the fact that the demulsifying agent will produce a 20% solution in kerosene and a 5% solution or suspension in water.

5. A process for breaking petroleum emulsions of the water-in-oil type, which consists in subjecting the emulsion to the action of an oil and water-soluble demulsifying agent containing (A) not over 40% of water;

(B) a water-soluble ammonium salt of a butylated naphthalene sulfonic acid; and (C) a naphthenic acid derived from naphthenic acid having a molecular weight range of from 200 to 575, a mean molecular weight of approximately 225, and a distillation range of from 230° C. to 310° C., in an amount approximately equal to the amount of B, the said mixture also being characterized by the fact that it is partially neutralized with ammonium hydroxide and that the demulsifying agent will produce a 20% solution in kerosene and a 5% solution or suspension in water.

6. A process for breaking petroleum emulsions of the water-in-oil type, which consists in subjecting the emulsion to the action of an oil and water-soluble demulsifying agent containing (A) not over 40% of water;

(B) a water-soluble ammonium salt of a butylated naphthalene sulfonic acid; and (C) a naphthenic acid derived from naphthenic acid having a molecular weight range of from 200 to 575, a mean molecular weight of approximately 225, and a distillation range of from 230° C. to 310° C., in an amount approximately equal to the amount of B, the said mixture also being characterized by the fact that it is partially neutralized with ammonium hydroxide and diluted with 25% of kerosene and that the demulsifying agent will produce a 20% solution in kerosene and a 5% solution or suspension in water.

MELVIN DE GROOTE.
ARTHUR F. WIRTEL.